(12) United States Patent (10) Patent No.: US 12,601,309 B2

Ogane (45) Date of Patent: Apr. 14, 2026

(54) HERMETICALLY SEALED CASE

(71) Applicant: HITACHI ASTEMO, LTD.,
Hitachinaka (JP)

(72) Inventor: Yuya Ogane, Hitachinaka (JP)

(73) Assignee: Hitachi Astemo, Ltd., Ibaraki (JP)

( * ) Notice: Subject to any disclaimer, the term of this
patent is extended or adjusted under 35
U.S.C. 154(b) by 0 days.

(21) Appl. No.: 18/575,865

(22) PCT Filed: Jun. 29, 2022

(86) PCT No.: PCT/JP2022/025893

§ 371 (c)(1),
(2) Date: Jan. 1, 2024

(87) PCT Pub. No.: WO2023/282137

PCT Pub. Date: Jan. 12, 2023

(65) Prior Publication Data

US 2024/0352905 A1 Oct. 24, 2024

(30) Foreign Application Priority Data

Jul. 8, 2021 (JP) ................................. 2021-113250

(51) Int. Cl.
F02F 11/00 (2006.01)
F16B 2/24 (2006.01)
F16J 15/10 (2006.01)

(52) U.S. Cl.
CPC .............. F02F 11/00 (2013.01); F16B 2/245
(2013.01); F16J 15/10 (2013.01)

(58) Field of Classification Search
CPC ........ F16B 5/0064; F16B 2/245; F16B 2/246;
F16J 15/021; F16J 15/028; F16J 15/061;
F16J 15/10; F02F 11/00
See application file for complete search history.

(56) References Cited

U.S. PATENT DOCUMENTS 1,331,470 A * 2/1920 Luckett ................... A24F 25/02
312/31.1
3,091,487 A * 5/1963 Gallagher ............... F16B 2/245
403/392

(Continued)

FOREIGN PATENT DOCUMENTS

JP S58-72708 A 4/1983
JP 2000-345867 A 12/2000
(Continued)

*Primary Examiner* — Nicholas L Foster

(74) *Attorney, Agent, or Firm* — Carrier, Shende &
Associates P.C.; Joseph P. Carrier; Jeffrey T. Gedeon

(57) ABSTRACT

Provided is a hermetically sealed case having a highly
reliable hermetically sealed structure with a simple configu-
ration. A hermetically sealed case 1 includes: a case body 7
having an opening 9 formed therein; a cover 8 that closes the
opening 9; a gasket 10 sandwiched between the case body 7
and the cover 8; and fastening members 13 that fix the cover
8 to the case body 7. Either one of the case body 7 and the
cover 8 is provided with a stopper 14 that defines the
compression amount of the gasket 10. When the internal
pressure of the hermetically sealed case 1 is high, the
fastening members 13 allow the cover 8 to separate from the
case body 7 so as to enable the abutment of the stopper 14
to be cleared.

3 Claims, 4 Drawing Sheets

(56)  References Cited

U.S. PATENT DOCUMENTS

| | | | | |
|---|---|---|---|---|
| 4,267,940 A * | 5/1981 | Wade | ...................... | F16J 13/24 |
| | | | | 220/4.12 |
| 4,556,150 A | 12/1985 | Ikumi | | |
| 4,619,343 A * | 10/1986 | Lengenfelder | .......... | F02F 7/008 |
| | | | | 181/208 |
| 5,072,851 A * | 12/1991 | Wilkes | .................... | F16J 12/00 |
| | | | | 220/684 |
| 5,121,852 A * | 6/1992 | Wilkes | .................. | B01D 35/30 |
| | | | | 220/684 |
| 5,722,707 A * | 3/1998 | Hosoi | .............. | H01L 21/67373 |
| | | | | 292/258 |
| 6,036,456 A * | 3/2000 | Peters | ............... | F02M 25/0836 |
| | | | | 417/423.3 |
| 10,900,386 B2 * | 1/2021 | Hoppe | .................... | F16B 2/245 |
| 12,258,793 B2 * | 3/2025 | Rosales | .................. | E05B 85/02 |
| 2010/0219185 A1 * | 9/2010 | Griffin | .................. | F16J 15/064 |
| | | | | 220/4.07 |
| 2019/0376421 A1 * | 12/2019 | Hoppe | .................... | F01L 1/344 |
| 2024/0084622 A1 * | 3/2024 | Rosales | .................. | E05B 77/34 |

FOREIGN PATENT DOCUMENTS

| | | | |
|---|---|---|---|
| JP | 2012-225291 A | 11/2012 | |
| JP | 2013-238126 A | 11/2013 | |
| JP | 2014-136964 A | 7/2014 | |
| JP | 2017-141702 A | 8/2017 | |
| JP | 2017-172428 A | 9/2017 | |

* cited by examiner

HERMETICALLY SEALED CASE

TECHNICAL FIELD

The present invention relates to a hermetically sealed case and, more particularly, to a hermetically sealed case that can be suitably installed at a position in a high temperature atmosphere, such as an engine compartment.

BACKGROUND ART

Hitherto, as this type of hermetically sealed case, there has been known one that is installed in the engine compartment of an automobile and houses an intake control device therein (refer to, for example, Patent Literature 1 shown below).

This one has a case body with an opening formed in one side thereof and a cover that closes the opening of the case body. The cover is fastened to the case body by a plurality of screw members, with the case body being closed.

A gasket is provided between the case body and the cover. The gasket is compressed and deformed by the fastening forces of the screw members when closing the cover, thus airtightly sealing the case body.

CITATION LIST

Patent Literature

Patent Literature 1: Japanese Patent Application Laid-Open No. 2017-172428

SUMMARY OF INVENTION

Technical Problem

According to the above-described conventional configuration, the case body and the cover can be firmly fastened by the screw members, so that the gap between the case body and the cover is securely sealed by the gasket, thus making it possible to securely obtain the airtightness inside the case body.

However, due to the threaded hole machining required for fastening the screw members and the placement of the screw members, the above-described configuration not only requires additional machining man-hours but makes it difficult to achieve a reduction in size.

In view of the above-described circumstances, an object of the present invention is to provide a hermetically sealed case having a highly reliable hermetically sealed structure with a simple configuration.

Solution to Problem

To this end, a first aspect of the invention is a hermetically sealed case that is placed in the vicinity of an internal combustion engine of an automobile or housed in an engine compartment in which the internal combustion engine is accommodated, including a case body having an opening formed in a part thereof; a cover closing the opening of the case body: a gasket sandwiched between the case body and the cover; and a fastening member fixing the cover to the case body, wherein the gasket is compressed by a fastening force of the fastening member, at least one of the case body and the cover is provided with a stopper that defines an amount of compression of the gasket in response to the fastening force in a direction in which the gasket is compressed by abutting against the other, and in the case where an internal pressure of the hermetically sealed case becomes higher with respect to an external pressure of the hermetically sealed case, the fastening member elastically deforms to allow the cover to be displaced so as to separate from the case body, thus making it possible to clear at least a part of the abutment of the stopper.

According to the above-described first aspect of the invention, when the internal pressure of the hermetically sealed case increases, the fastening member elastically deforms such that the cover is displaced to separate from the case body. This clears at least a part of the abutment of the stopper, and at the same time, the compression of the gasket between the cover and the case body is reduced. Consequently, the sealability of the gasket decreases, and the so-called relief function, by which the internal pressure of the case is discharged to the outside, is obtained. Then, when the internal pressure of the case is discharged to the outside, a contact pressure force against the case body is imparted to the cover due to the recovery elasticity of the fastening member, so that the abutment of the stopper and the compressed state of the gasket are restored, thus forming the hermetically sealed state of the hermetically sealed case.

Although the above-described relief function may be set so as to be disabled at a guaranteed temperature, it is undesirable to cause a state of unavailability immediately after the guaranteed temperature is exceeded. Therefore, even in the case of abnormal use such as exceeding the guaranteed temperature, the configuration of the present invention advantageously ensures minimum functions and expands warranty coverage.

Further, according to a second aspect of the invention, in the case where a cut surface which is obtained by cutting the hermetically sealed case in a direction perpendicular to a circumferential direction around the opening and which is cut in an area including the fastening member is observed, the fastening member is a clip member including a pair of elastic arms, which extend in such a manner as to recede from a stopper end portion of the stopper abutting the case body or the cover as the elastic arms recede from the opening, and a connection base connecting the pair of elastic arms that are away from the opening, both or either one of the cover and the case body is provided with a fastening abutment surface that abuts against the elastic arms, and a fall-off prevention bank placed farther than the fastening abutment surface from the opening and farther than the fastening abutment surface from the stopper end portion, and a surface of the fall-off prevention bank on a side facing the elastic arms is a curved surface.

According to the above-described second aspect of the invention, as the cover is displaced to separate from the case body when the internal pressure of the hermetically sealed case increases, the location where the elastic arms of the clip member are in contact with the fastening abutment surface gradually moves away from the opening. At this time, an input point of the fastening force applied to the elastic arms approaches a connection base, so that if an attempt is made to increase the moment based on location of connection between the elastic arms and the connection base, then the rate of increase in the force that must be applied to the elastic arms will be greater than the rate of increase in the moment. In other words, the farther the cover moves from the case body, the greater the force required to separate the cover from the case body.

Due to the above-described operation, even if the internal pressure of the hermetically sealed case increases and the cover is displaced away from the case body, the distance between the cover and the case body can be maintained within a certain range.

Further, employing the clip member that has the above-described configuration as the fastening member eliminates the need for threaded hole machining, which is required when using a plurality of screw members, and also permits miniaturization.

Further, according to a third aspect of the invention, in the case where the cut surface is observed, the gasket includes both a first side which is in contact with the case body and becomes substantially linear, and a second side which is in contact with the cover, opposing the first side, and which becomes substantially linear in a state in which the fastening force has been removed, and an area between the first side and the second side is solid.

According to the above-described third aspect of the invention, not a large amount of compression displacement in the fastening direction is required to secure a surface pressure necessary for sealing. In other words, the sealability can be immediately lost by slightly displacing the cover in the direction of releasing the compression. This means that the displacement of the cover can be kept to a minimum when the above-described relief function is activated.

Further, in the case where the above-described configuration of the second aspect of the invention is adopted, if the cover is displaced beyond a certain position, deformation may take place beyond the elastic deformation range of the clip member. However, by adding the configuration of the third aspect of the invention, the internal pressure of the hermetically sealed case is released within the elastic deformation range to suppress the displacement, thereby making it possible to suppress abnormal deformation of the clip member.

DESCRIPTION OF EMBODIMENTS

Figure 1:
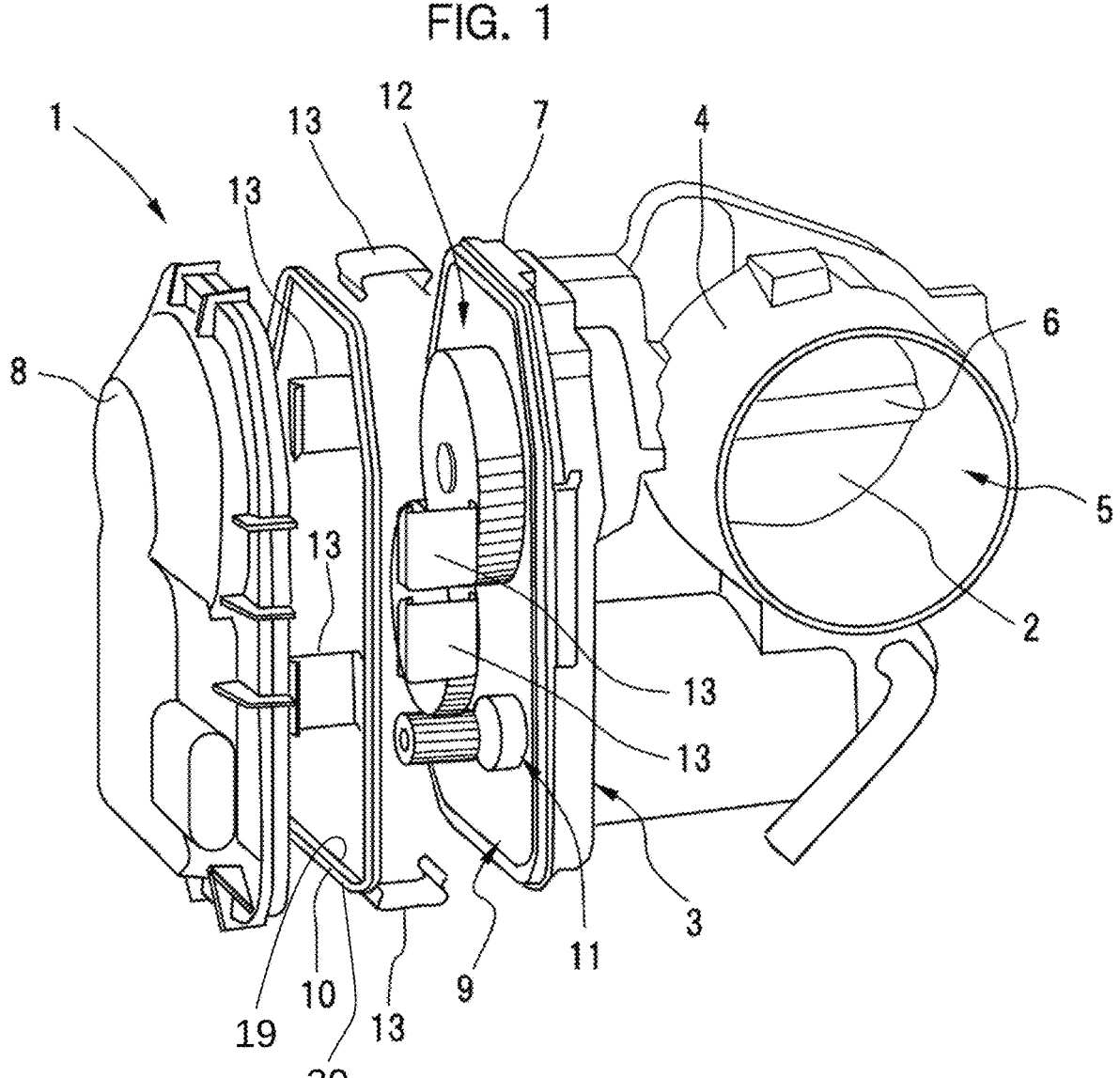
FIG. 1 is an explanatory perspective view illustrating a hermetically sealed case of an embodiment of the present invention.

An embodiment of the present invention will be described with reference to the accompanying drawings. FIG. 1 is an intake control device provided with a hermetically sealed case 1 of the present invention. The intake control device is provided in the vicinity of an internal combustion engine mounted on a vehicle, and includes a valve body 2 and a valve drive 3 as illustrated in FIG. 1. The valve drive 3 is housed in the hermetically sealed case 1. The valve body 2 is provided in a cylindrical section 4 provided continuously to the hermetically sealed case 1.

An intake passage 5 is formed inside the cylindrical section 4. The valve body 2 is located inside the cylindrical section 4 to adjust the flow rate of air running through the intake passage 5. The valve body 2 is fixed to a valve shaft 6 that extends across the intake passage 5 and is rotatably supported by the cylindrical section 4.

The hermetically sealed case 1 includes a case body 7 and a cover 8. In the case body 7, an opening 9 with one side surface thereof open is formed, and the opening 9 is closed by the cover 8. At this time, a gasket 10 is interposed between the peripheral edge of the opening 9 of the case body 7 and the peripheral edge of the cover 8 such that airtightness is obtained by the gasket 10 when the opening 9 is closed by the cover 8.

An electric motor 11 and a power transmission mechanism 12 are housed in the case body 7. The power transmission mechanism 12 is composed of a plurality of gears to transmit the power of the electric motor 11 to the valve shaft 6.

The cover 8 is fastened to the case body 7 by a plurality of clip members 13 provided as fastening members. For convenience of explanation, FIG. 1 illustrates the opening 9 of the case body 7 in an opened state.

Figure 2:
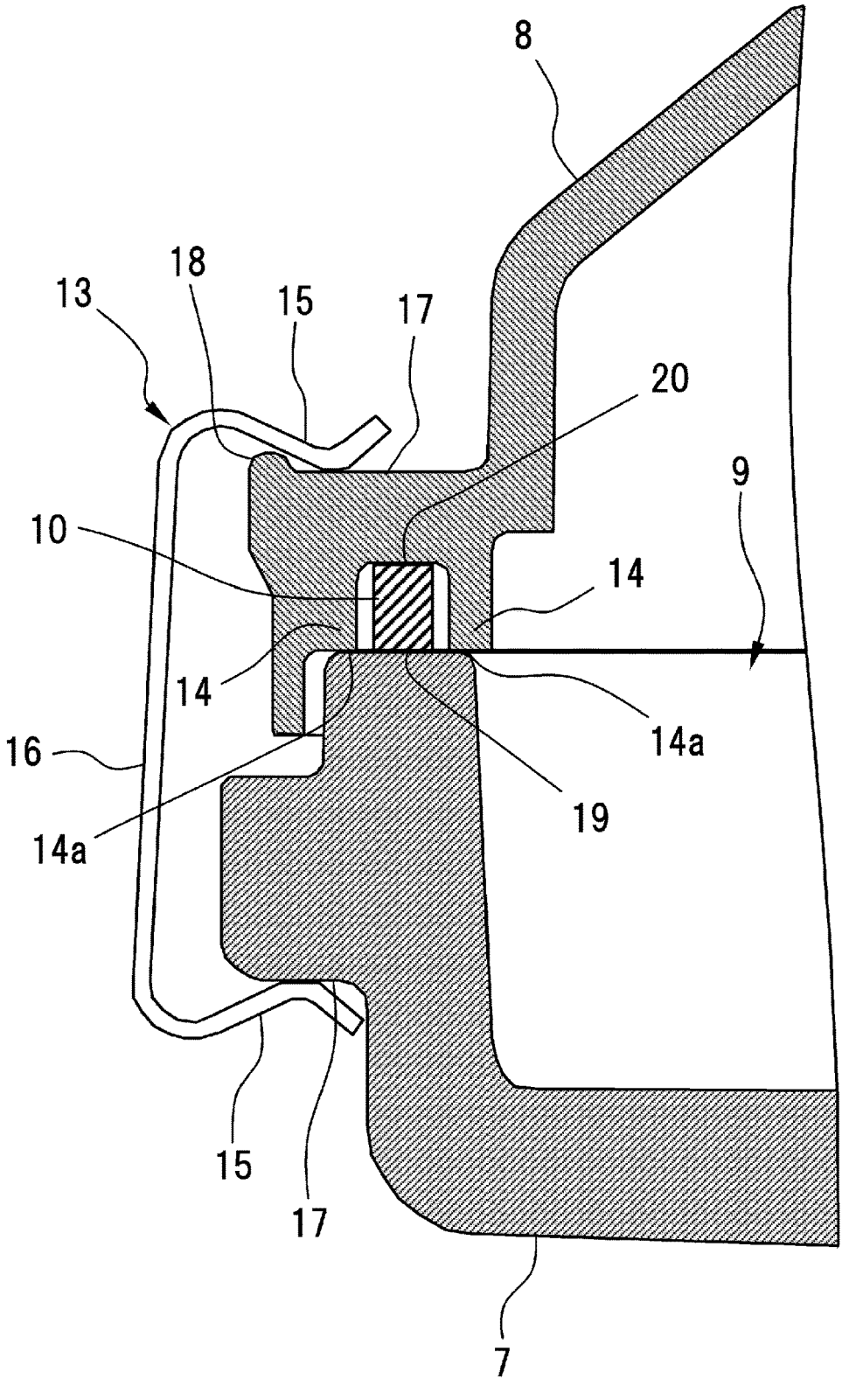
FIG. 2 is an explanatory sectional view of an essential part of the hermetically sealed case of the present embodiment.

When the cover 8 closes the opening 9 of the case body 7, the cover 8 and the case body 7 sandwich the gasket 10, as partly illustrated in FIG. 2. The cover 8 has stoppers 14 formed therein.

The stoppers 14 are formed in the vicinity of the gasket 10, and when the cover 8 closes the opening 9 of the case body 7, end portions 14a (stopper end portions) come in contact with the peripheral edge of the opening 9 of the case body 7. At this time, the approach distance between the cover 8 and the case body 7 is restricted by the stoppers 14, thus defining the amount of compression of the gasket 10.

Each of the clip members 13 is formed of a material having elasticity, and includes a pair of elastic arms 15 and a connection base 16. The elastic arms 15 extend in such a manner as to recede from the stopper end portions 14a as the elastic arms 15 recede from the opening 9 of the case body 7. The connection base 16 connects the proximal end portions of the elastic arms 15 (the end portions away from the opening 9).

Each of the clip members 13 is formed such that the distal ends of the pair of elastic arms 15 are urged in a direction in which the distal ends approach to each other, and the urging force acts as a fastening force.

The outer peripheral surface of the cover 8 is provided with a fastening abutment surface 17 with which the elastic arms 15 of the clip members 13 come in contact, and a fall-off prevention bank 18 that rises along the outer edge of the fastening abutment surface 17. The fall-off prevention bank 18 is placed to be farther than the fastening abutment surface 17 from the opening 9 and also farther than the fastening abutment surface 17 from the stopper end portions 14a.

As illustrated in FIG. 2, the gasket 10 is solid and rectangular in a sectional view, and has a first side 19 in contact with the case body 7 and a second side 20 in contact with the cover 8. The gasket 10 is formed such that the first side 19 and the second side 20 are substantially linear when the fastening force of the clip members 13 is not being applied. In the sectional view, the gasket 10 has the first side 19 and the second side 20, and both the first side 19 and the second side 20 are configured as annular surfaces.

According to the hermetically sealed case 1 configured as described above, the so-called relief function can be imparted to the sealing of the case body 7 by the cover 8. More specifically, when the internal pressure of the hermetically sealed case 1 increases to a level that counteracts the fastening force of the clip members 13, the stopper end portions 14a of the cover 8 separate from the case body 7, reducing the compression of the gasket 10. This discharges the excess internal pressure of the hermetically sealed case 1 to the outside, thus making it possible to prevent an extreme increase in the internal pressure of the hermetically sealed case 1.

Further, when a guaranteed temperature is set in the hermetically sealed case 1, it is possible to obtain an operation for mitigating an extreme increase in the internal pressure of the hermetically sealed case 1 as described above even under a usage environment exceeding the guaranteed temperature. Therefore, even if abnormal usage involving, for example, a temperature exceeding the guaranteed temperature is performed, the minimum functions can be secured by the above-described configuration and the warranty coverage can be expanded.

Further, according to the hermetically sealed case 1 configured as described above, when the internal pressure increases and the cover 8 is displaced away from the case body 7, the distance between the cover 8 and the case body 7 can be maintained within a certain range.

Figure 3A:
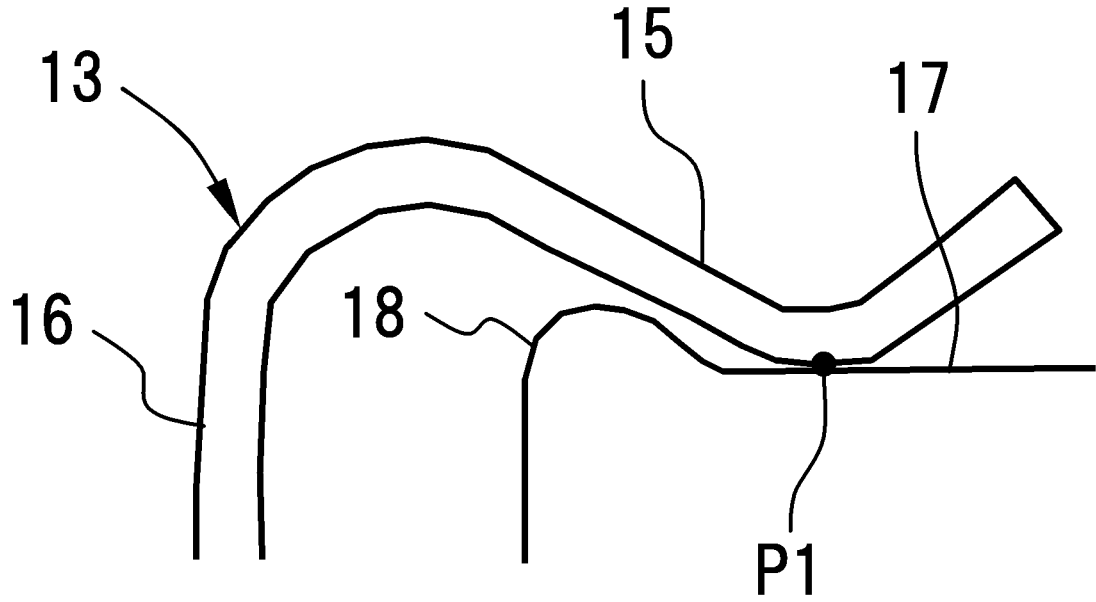
FIG. 3A is an explanatory diagram illustrating a state in which an elastic arm of a clip member is in contact with a fastening abutment surface.

To describe the operation at this time in more detail, even when the internal pressure of the hermetically sealed case 1 increases, the contact with the fastening abutment surface 17 at a first abutment point P1 in the elastic arm 15 of the clip member 13 is maintained as illustrated in FIG. 3A in a state in which the contact between the stoppers 14 of the cover 8 and the case body 7 is maintained.

When the internal pressure of the hermetically sealed case 1 continues to increase and starts to exceed the fastening force of the clip members 13, the cover 8 separates from the case body 7. Consequently, the elastic arms 15 of the clip members 13 are deformed away from the opening 9.

Figure 3B:
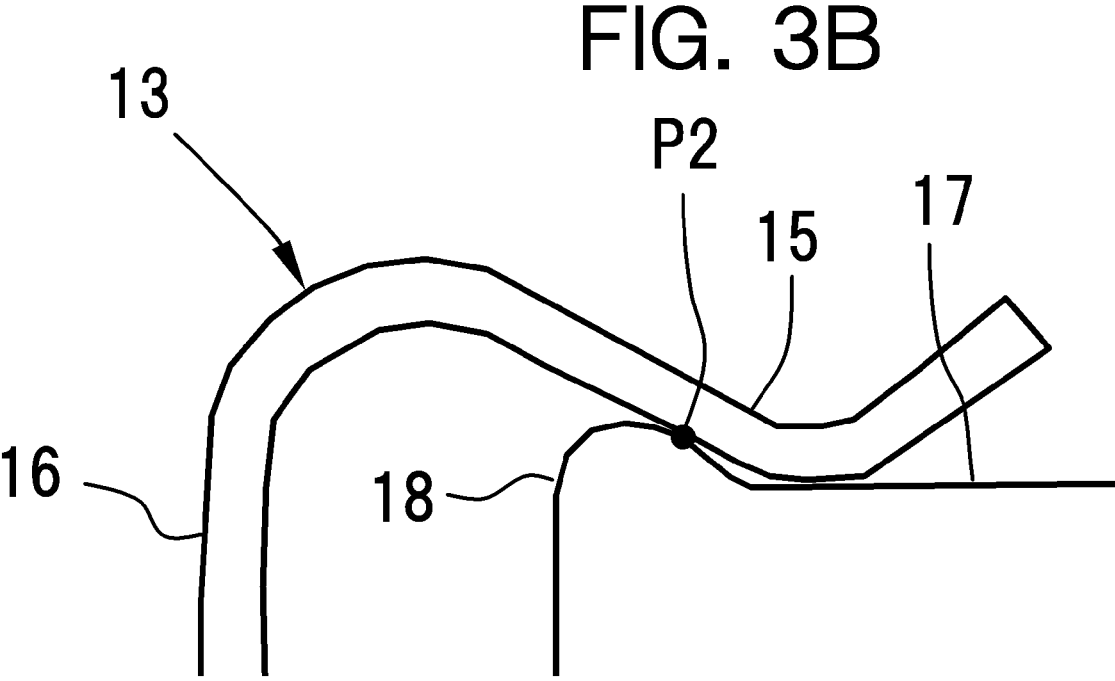
FIG. 3B is an explanatory diagram illustrating a state in which the elastic arm of the clip member is in contact with the side surface of a fall-off prevention bank.

Then, in the elastic arm 15 of the clip member 13, a second abutment point P2 on the connection base 16 side comes in contact with the side surface of the fall-off prevention bank 18 as illustrated in FIG. 3B. At this time, the fastening force of the clip member 13 at the second abutment point P2 positioned closer to the connection base 16 than the first abutment point P1 is greater than the fastening force at the first abutment point P1.

Figure 3C:
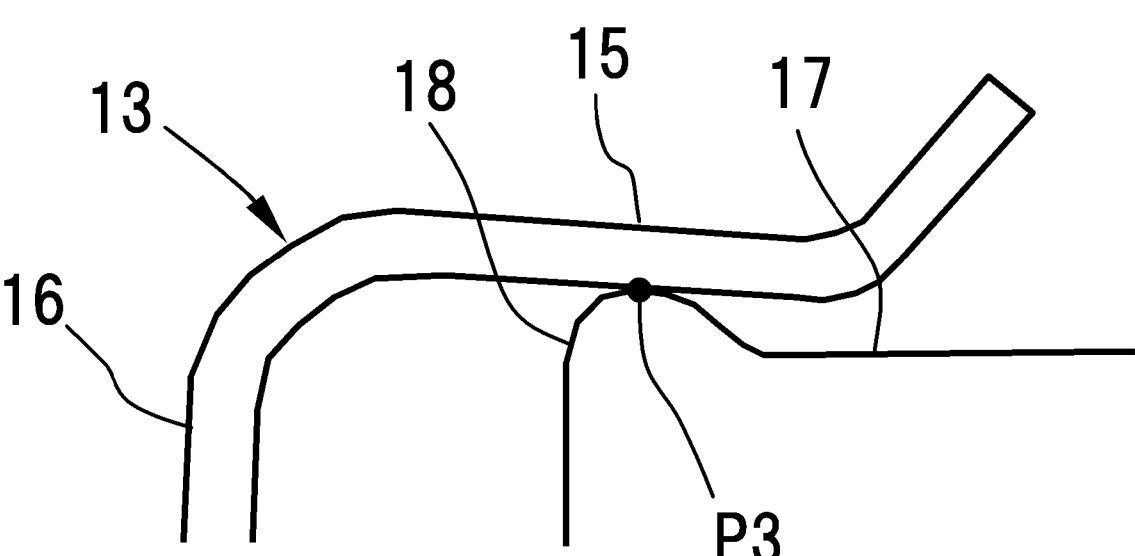
FIG. 3C is an explanatory diagram illustrating a state in which the elastic arm of the clip member is in contact with the top of the fall-off prevention bank.

Further, when the internal pressure of the hermetically sealed case 1 continues to increase further, the elastic arm 15 of the clip member 13 moves further away from the opening 9, and the elastic arm 15 of the clip member 13 comes in contact with substantially the top portion of the fall-off prevention bank 18 at a third abutment point P3 as illustrated in FIG. 3C.

As described above, as the internal pressure of the hermetically sealed case 1 increases, the abutment position of the elastic arms 15 of the clip members 13 changes from the first abutment point P1 to the third abutment point P3 in the direction in which the fastening force increases. Thus, the separation distance between the cover 8 and the case body 7 can be maintained within the certain range. Accordingly, although not illustrated, if, for example, the cover 8 is provided with an opening degree sensor, changes in distance between a rotor fixed to the valve shaft 6 and the opening degree sensor are minimized, so that high sensor accuracy can be maintained.

Further, as illustrated in FIG. 2, the gasket 10 includes the first side 19 in contact with the case body 7 and the second side 20 in contact with the cover 8, so that not much compression displacement is required in the fastening direction to secure a surface pressure necessary for sealing.

Therefore, the state of hermetic sealing by the gasket 10 is easily cleared by slightly displacing the cover 8 in the direction in which the compression of the gasket 10 is released. This makes it possible to rapidly discharge excess internal pressure of the hermetically sealed case 1 with a minimum amount of displacement of the cover 8.

In addition, the internal pressure of the hermetically sealed case 1 is discharged in the elastic deformation range of the clip members 13 to suppress the displacement of the cover 8, thus making it possible to prevent the clip members 13 from being abnormally deformed.

The present embodiment shows the cover 8 provided with the stoppers 14, but the present invention is not limited thereto. More specifically, the stoppers in the present invention may be provided in both the cover 8 and the case body 7, or provided only in the case body 7.

Further, the present embodiment shows the fall-off prevention bank 18 provided only in the cover 8, but the fall-off prevention bank 18 may be provided in both the cover 8 and the case body 7, or only in the case body 7.

Further, in the present embodiment, the hermetically sealed case 1 of the intake control device provided in the vicinity of the internal combustion engine mounted on a vehicle has been described, but the hermetically sealed case of the present invention is not limited thereto, and can be suitably employed in a device located in the vicinity of an internal combustion engine of a vehicle, or housed in an engine compartment accommodating an internal combustion engine.

DESCRIPTION OF REFERENCE NUMERALS

1 . . . hermetically sealed case; 7 . . . case body; 8 . . . cover; 9 . . . opening; 10 . . . gasket; 13 . . . clip member (fastening member); 14 . . . stopper; 14a . . . stopper end portion; 15 . . . elastic arm; 16 . . . connection base; 17 . . . fastening abutment surface; 18 . . . fall-off prevention bank; 19 . . . first side; and 20 . . . second side.

The invention claimed is:

1. A hermetically sealed case for use with an internal combustion engine of an automobile, comprising:

a case body having an opening formed in a part thereof, a cover closing the opening of the case body; a gasket sandwiched between the case body and the cover; and a fastening member fixing the cover to the case body, wherein the gasket is compressed by a fastening force of the fastening member, the cover is provided with a stopper that defines an amount of compression of the gasket in response to the fastening force in a direction in which the gasket is compressed by abutting against the case body, wherein the hermetically sealed case is configured such that if an internal pressure of the hermetically sealed case becomes higher with respect to an external pressure of the hermetically sealed case, the fastening member can elastically deform to allow the cover to be displaced so as to separate from the case body, and the stopper can be at least partially separated from the case body, wherein the stopper is arranged closer to the opening of the case body than the gasket, wherein the fastening member is a clip member including a pair of elastic arms, which extend in such a manner as to recede from a stopper end portion of the stopper abutting the case body as the elastic arms recede from the opening, and a connection base connecting the pair of elastic arms at farther sides from the opening, wherein the cover is provided with a fastening abutment surface that abuts against the elastic arms, and a fall-off prevention bank placed farther than the fastening abutment surface from the opening and farther than the fastening abutment surface from the stopper end portion, wherein a surface of the fall-off prevention bank on a side facing the elastic arms is a curved surface, and wherein the elastic arms are configured such that, while the abutment between the stopper and the case body is maintained and there is no contact with the fall-off prevention bank, contact with the fastening abutment surface is maintained, and when the internal pressure of the hermetically sealed case exceeds the fastening force of the clip member and the cover separates from the case body, the elastic arms move to a position farther from the opening, come into contact with the fall-off prevention bank, and separate from the fastening abutment surface.

2. The hermetically sealed case according to claim 1, the gasket includes a first side which is in contact with the case body and a second side which is in contact with the cover, opposing the first side, and wherein the first and second sides are substantially linear, and an area between the first side and the second side is solid.

3. The hermetically sealed case according to claim 2, wherein the gasket includes left and right sides disposed perpendicularly to the first side, and wherein first and second spaces are provided respectively adjacent to the right and left sides of the gasket separating the gasket from the case body.

\* \* \* \* \*